United States Patent [19]

Stewart

[11] Patent Number: 4,913,711
[45] Date of Patent: Apr. 3, 1990

[54] SPIRAL COIL COOL WALL CONSTRUCTION FOR HIGH TEMPERATURE CYLINDRICAL FURNACES, VESSELS, CYCLONES, ETC.

[75] Inventor: Robert D. Stewart, Verona, N.J.

[73] Assignee: Foster Wheeler Energy Corporation, Clinton, N.J.

[21] Appl. No.: 614,393

[22] Filed: May 25, 1984

Related U.S. Application Data

[63] Continuation of Ser. No. 399,095, Jul. 16, 1982, abandoned.

[51] Int. Cl.$^4$ .............................................. B01D 45/12
[52] U.S. Cl. ........................................ 55/269; 55/435; 55/459.1; 165/169
[58] Field of Search .................... 55/267–269, 55/435, 459 R; 165/169; 110/323–325

[56] References Cited

U.S. PATENT DOCUMENTS

| | | | |
|---|---|---|---|
| 1,488,701 | 4/1924 | Nicholson | 110/325 |
| 1,822,221 | 9/1931 | Jones | 55/267 X |
| 1,890,170 | 12/1932 | Van Brunt | 165/169 X |
| 1,906,710 | 5/1933 | Murray | 165/169 X |
| 2,012,216 | 8/1935 | Baumann | 165/169 X |
| 2,437,294 | 3/1948 | Dalin | 55/269 |
| 2,617,761 | 11/1952 | Sheer et al. | 55/122 X |
| 2,800,974 | 7/1957 | Gilman et al. | 165/169 X |
| 2,970,042 | 1/1961 | Lagerwey | 165/169 X |
| 2,995,807 | 8/1961 | Gibbs | 165/169 X |
| 3,050,954 | 8/1962 | Royse | 55/269 X |
| 3,327,456 | 6/1967 | Guber, Jr. et al. | 55/269 |
| 3,409,074 | 11/1968 | Wagner et al. | 165/169 X |
| 3,470,678 | 10/1969 | Clark et al. | 55/269 |
| 3,554,706 | 1/1971 | Henderson | 55/269 X |
| 3,710,857 | 1/1973 | Meyer et al. | 165/169 |
| 4,295,343 | 10/1981 | Izumi | 55/261 X |

FOREIGN PATENT DOCUMENTS

| | | | |
|---|---|---|---|
| 0107520 | 5/1984 | European Pat. Off. | |
| 2042907 | 3/1972 | Fed. Rep. of Germany | 55/269 |
| 1184834 | 7/1959 | France | |
| 2533680 | 3/1984 | France | |
| 709182 | 1/1980 | U.S.S.R. | 55/269 |
| 567450 | 2/1945 | United Kingdom | |
| 581426 | 10/1946 | United Kingdom | 55/267 |
| 641357 | 8/1950 | United Kingdom | |
| 1114252 | 5/1968 | United Kingdom | |

Primary Examiner—Robert Spitzer
Attorney, Agent, or Firm—Marvin A. Naigur; Warren B. Kice

[57] ABSTRACT

A vessel for separating entrained particles from a gas in which a vertically extending tubular portion extends through a portion of a housing for providing an outlet for the gas after separation from the particles. The tubular portion includes a tube formed into a spiral coil, and a continuous fin extends from the tube for the entire length of the tube. The fin is welded to adjacent sections of the tube to render the coil airtight. A layer of insulation material extends to both sides of the coil.

5 Claims, 2 Drawing Sheets

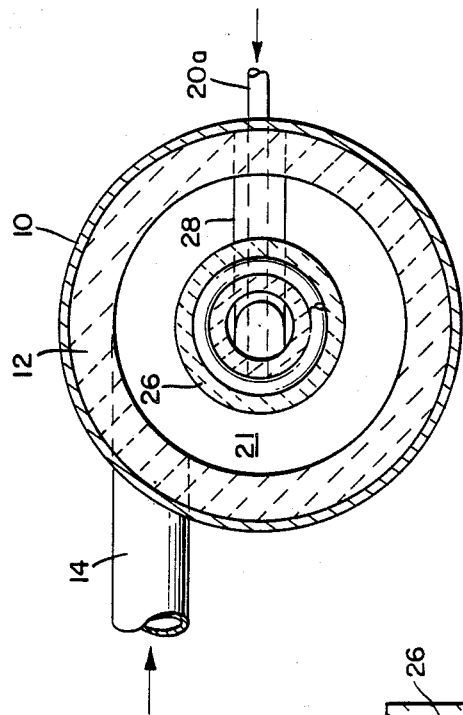
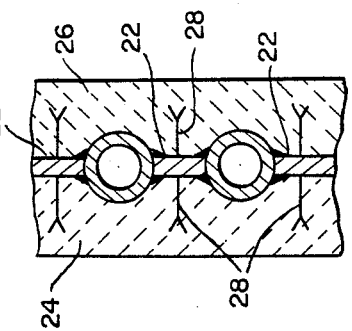
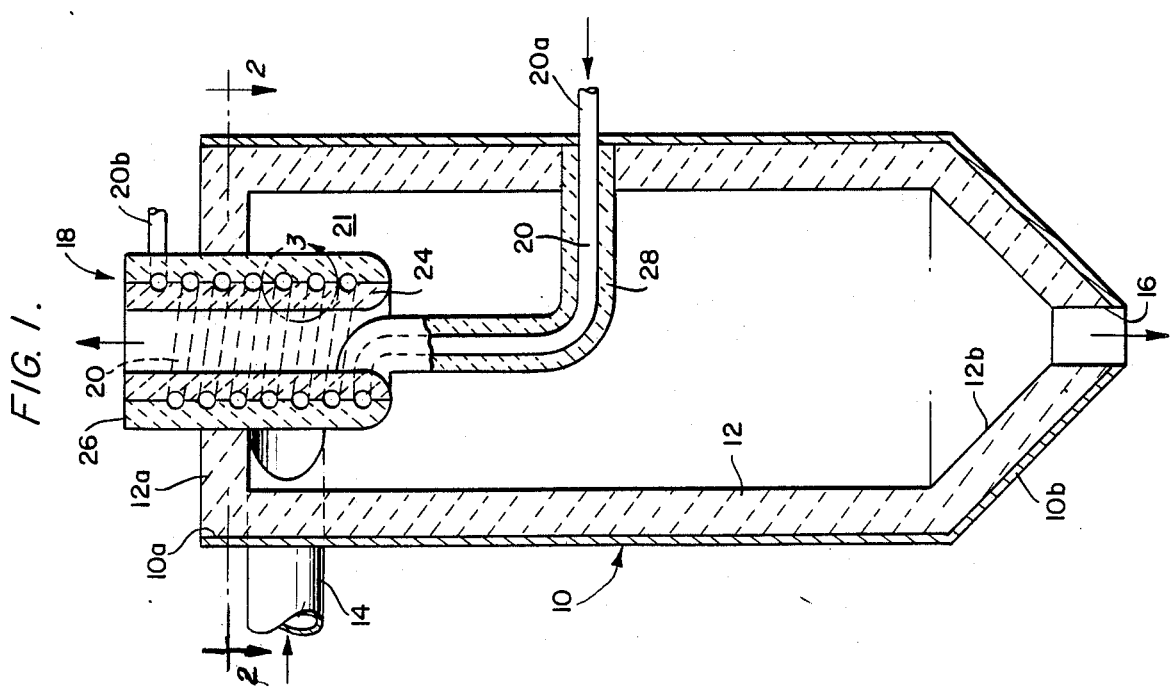

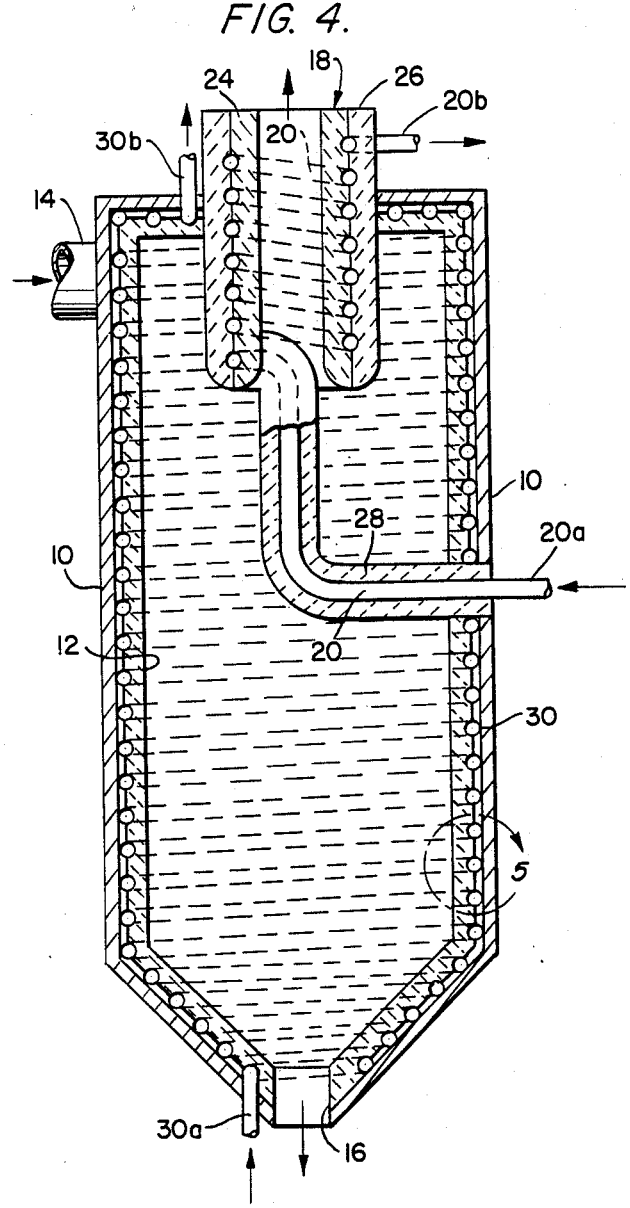
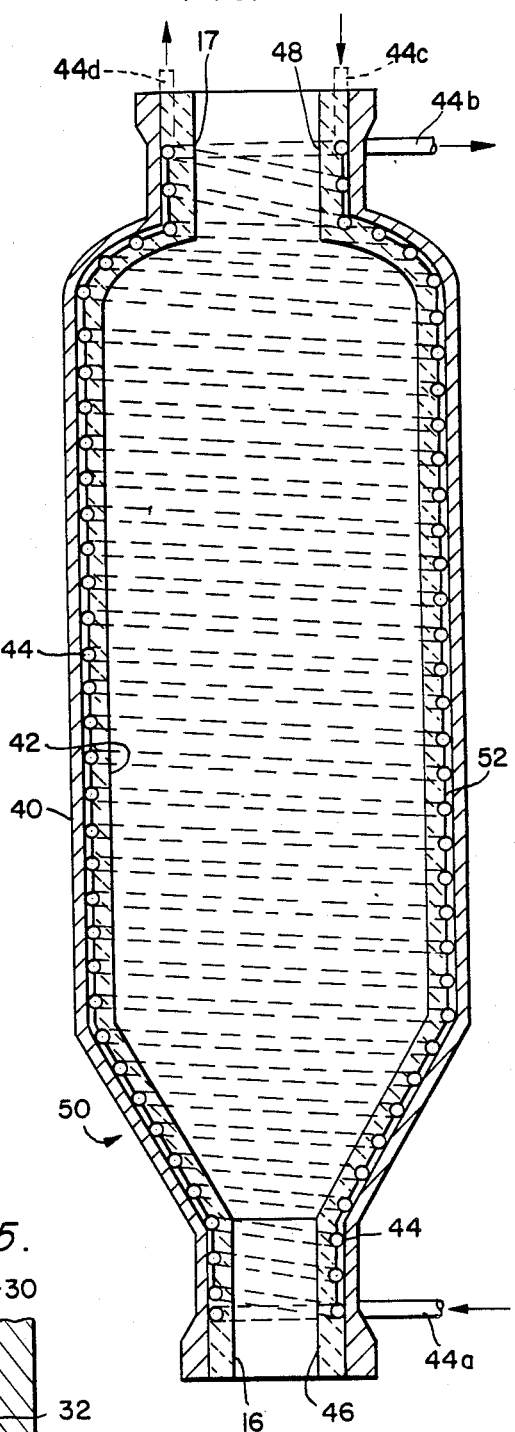
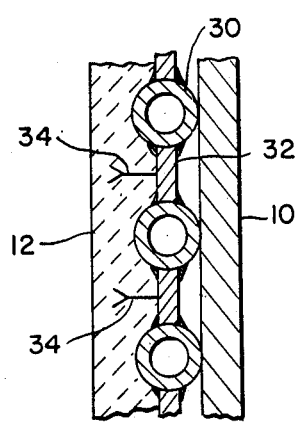

SPIRAL COIL COOL WALL CONSTRUCTION FOR HIGH TEMPERATURE CYLINDRICAL FURNACES, VESSELS, CYCLONES, ETC.

This application is a continuation of application Ser. No. 399,095, filed 7/16/82, now abandoned.

BACKGROUND OF THE INVENTION

This invention relates to high temperature process vessels such as furnaces, reactors, containment vessels, cyclones, etc. which are subjected to relatively high temperatures and, more particularly, to such type of vessels in which water cooled spiral coils are provided to reduce the temperature of the vessel.

Certain types of process vessels, such as cylindrical furnaces, cyclone separators or the like, operate at extremely high temperatures, such as 3000° F., and therefore must be designed to continuously withstand the temperature without failing. For example, cyclone separators used in coal gasification, incineration, fuel combustion, calcining, etc., include a gas discharge tube, or vortex finder, located centrally within the cyclone separator and extending into the housing below the top of the separator. Since both the exterior and the interior walls of the discharge tube are exposed to extremely high temperature conditions these walls must be fabricated from materials including a commercially available ceramic or refractory material. However, it is difficult, if not impossible, to construct a gas discharge tube of the above type entirely of such material without encountering structural limitations and support problems. For example, it has been suggested to construct the discharge tube from metallic materials and insulate same on both sides with ceramic or refractory materials. However, this is unsatisfactory since both sides of the tube are exposed to the high temperature and the metal is trapped within the insulation materials and is subjected to the high temperature on both sides. Thus, the metal can reach its molten temperature and fail structurally. Other attempts to cope with this problem include designs having water-cooled tangent tubes in front of the refractory or internal vessel heads, fluidization grids, cyclone throats, etc. However, each of these designs gives rise to other problems, such as inadequate sealing, poor support and short life spans.

SUMMARY OF THE INVENTION

It is therefore an object of the present invention to provide a vessel and a discharge tube associated with the vessel for withstanding relatively high temperatures and which is relatively free of any structural or support problems.

It is a further object of the present invention to provide a vessel of the above type which contains a water-cooled spiral coil forming a portion of the wall or discharge tube of the vessel.

It is a further object of the present invention to provide a vessel of the above type in which the vessel wall and/or discharge tube is formed by a water-cooled spiral coil insulated by refractory material in a manner to structurally stabilize the assembly.

It is a further object of the instant invention to provide a vessel of the above type in which the spiral coil forms the major structural support and that by selection of cooling fluids and control of their temperatures, the spiral coil can be kept at a temperature above the dew-points of corrosive specie in the contained gases such as $H_2CO_3$, $H_2SO_3$, $H_2SO_4$, etc. in the vessel.

It is a still further object of the present invention to provide a vessel of the above type in which the adjacent tube portions forming the spiral coil are welded together.

Toward the fulfillment of these and other objects, the vessel of the present invention includes a housing having a generally horizontally extending gas inlet and an outlet for the separated particles. A vertically extending tubular portion extends through the upper portion of the housing for providing an outlet for the gas after separation from the particles, and includes a water tube formed into a spiral coil and a layer of insulation material to at least one side of the coil.

BRIEF DESCRIPTION OF THE DRAWINGS

The above brief description, as well as further objects, features and advantages of the present invention will be more fully appreciated by reference to the following detailed description of a presently preferred but nonetheless illustrative embodiment in accordance with the present invention, when taken in conjunction with the accompanying drawings wherein:

FIG. 1 is a vertical cross-sectional view of the vessel of the present invention;

FIG. 2 is a horizontal cross-sectional view taken along the lines 2—2 of FIG. 1;

FIG. 3 is an enlarged partial view within the area denoted by the reference numeral 3 in FIG. 1;

FIGS. 4 and 6 are views similar to FIG. 1, but depicting alternate embodiments of the present invention; and FIG. 5 is an enlarged partial view within the area denoted by reference numeral 5 in FIG. 4.

DESCRIPTION OF THE PREFERRED EMBODIMENTS

An exemplary embodiment of the vessel of the present invention is shown in FIGS. 1-3 in the form of a cyclone separator consisting of a metallic outer cylindrical shell 10 having an open upper end portion 10a and a conically shaped lower end portion 10b. A refractory lining 12 extends immediately within the shell 10 and has an upper top portion 12a having a central opening formed therein for reasons that will be described in detail later, and a lower conical portion 12b complementing the end portion 10b of the shell 10.

An inlet pipe 14 extends substantially horizontally at the upper portion of the shell 10 and extends through a suitable opening formed in the wall of the shell and in a tangential relation to the interior of the shell as better shown in FIG. 2. Thus, hot gases containing entrained particulate material entering the inlet pipe 14 are discharged into the interior of the shell in a substantially tangential relationship to the interior wall thereof which promotes separation of the particulate material from the gases, in a conventional manner. An outlet opening 16 is formed through the lower end portions of the shell 10 and the lining 12 to permit discharge of the particulate material to external processing apparatus (not shown).

A water-cooled outlet tube assembly, shown in general by the reference numeral 18, is provided through the aforementioned central opening formed in the top portion 12a of the lining 12. The assembly 18 consists of a tube 20 formed in a spiral coil configuration extending from the interior of the vessel upwardly through the opening and projecting from the latter opening. The diameter of the spiral coil portion of the tube 20 is less than that of the interior wall portion of the lining 12 to form an annular chamber 21.

One end portion 20a of the tube 20 extends through appropriate openings formed through the side wall of the shell 10 and the corresponding portion of the lining 12, and across the shell and upwardly to the spiral portion, as shown. The other end portion 20b of the tube 20 extends outwardly from the plane of the spiral portion projecting from the upper end portion of the shell 10, for connection to external equipment (not shown). As better shown in FIG. 3, a continuous fin 22 is attached to the spiral coil portion of the tube 20 for its entire length and is connected between adjacent sections of the spiral portions of the tube 20 by weldments, or the like, to render the spiral portion airtight.

The tube assembly 18 also includes two tubular portions 24 and 26 of refractory insulation material extending to either side of the spiral portion of the tube 20. The tubular portions 24 and 26 are secured to the spiral portion of the tube 20 by a plurality of anchors 28 extending from the fin 22 and into the tubular portions as shown. An insulating material, shown in general by the reference numeral 29, also surrounds that portion of the tube 20 between its end portion 20a and the spiral portion.

A cooling fluid, such as water, is circulated through the tube 20 by a pump, or the like, (not shown) connected between the tube end portions 20a and 20b to reduce the temperature of the tube 20.

In operation, gases from the inlet tube 14 are introduced into the interior of the shell 10 and into the annular chamber 21 and the centrifugal forces thus created cause a separation of the particulate material entrained in the gas. The separated particulate material falls downwardly by gravity and discharges from the shell through the outlet 16, while the clean gases rise by convection upwardly through the hollow portion of the tube assembly 18 and outwardly to external apparatus for further processing.

The spiral coil tube 20 provides a structural support for the refractory portions 24 and 26 to render them structurally stable. Also, the temperatures surrounding the tube can be kept below a value that will cause potential damage. Further, in situations in which corrosive specie, such as $H_2CO_3$, $H_2SO_3$, $H_2SO_4$, etc., are present in the gases introduced into the chamber 21, the temperature of the spiral tube 20 can be kept at a temperature above the dewpoint of these specie to eliminate any corrosion.

The embodiment of FIG. 4 is similar to that of FIGS. 1-3, and identical components will be given the same reference numbers.

According to the embodiment of FIG. 4, an additional spiral coil tube, shown in general by the reference numeral 30 is sandwiched between the liner 12 and the metallic shell 10, and has a continuous fin 32 attached thereto and extending for the length of the tube.

As shown in FIG. 5, a plurality of anchors 34 extend from the interior side of the fin 32 into the refractory material of the liner 12 to anchor the latter in place.

The spiral coil portion of the tube 30 is shaped to conform to the shape of the shell 10 and includes a conically shaped lower end portion. The upper portion of the spiral coil extends horizontally as shown in FIG. 4, with the adjacent sections of the coil being connected by the fin 32.

The lower and upper end portions 30a and 30b of the tube 30 extend externally of the shell 10 as shown and are adapted to be connected to a pump or the like, for circulating a cooling fluid through the tube as in the previous embodiment. Since the tube assembly 18 of the shell of FIG. 4 is formed and cooled in a manner identical to that of the previous embodiment, the entire vessel may be utilized in a very high temperature environment.

It is understood that the shell of the present invention is not limited to cyclone separators as discussed in connection with the above two exemplary embodiments. For example, and referring to FIG. 6, the vessel can be a process vessel having an outer metallic shell 40, an inner refractory lining 42 and spiral coil tube 44 sandwiched therebetween. The shell 40, the lining 42 and the tube 44 each have a necked-down portion in the upper and lower portions of the shell to define an open inlet 46 at the lower end portion of the shell and an outlet 48 at the upper end portion of the shell, and a conical portion 50 extending between the lower necked-down portion and the cylindrical wall portion.

The tube 44 extends in a spiral coil configuration from the lower inlet end portion to the upper outlet end portion of the shell 40 and has two end portions 44a and 44b extending out of the plane of the shell and functioning as an inlet and outlet, respectively for a cooling fluid as in the previous embodiment.

A continuous fin 52 is connected to the tube 44 and extends between adjacent tube sections for the entire length of the shell to render the shell gas-tight.

Though not clear from the drawing, it is understood that anchors similar to those disclosed in the previous embodiments can be utilized to anchor the refractory lining 42 relative to the spiral coil tube 44.

A cooling fluid, upon being introduced into the inlet portion 44a of the tube 44 travels the entire distance of the shell before discharging through the outlet end tube portion 44b to maintain the vessel at a lower temperature than otherwise would be possible.

The material to be processed, whether in a solid, liquid or gaseous form, is introduced into the shell inlet 46 where it passes upwardly into the shell where the desired reaction is completed, with the reacted material then discharging from the outlet 48.

It is understood that in each of the previous embodiments, the particular location of the inlet and outlet of the water tubes can be varied within the scope of the invention. For example, both the inlet and outlet end portions of the water tube can be located at the upper portion of the shell as shown by the reference numerals 44c and 44d, respectively, in FIG. 6. In this configuration the water would flow downwardly through alternating sections of the spiral coil tube and then upwardly through other alternating sections before discharging from the outlet end portion 44d. It is understood that this circuit can also be incorporated in any of the previous embodiments.

In each of the embodiments of the present invention, a shell is provided with or without a discharge tube, that is stable from a structural standpoint, yet is immune to corrosion and can withstand relative high temperatures.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention therein.

What is claimed is:

1. A vessel for separating entrained particles from a gas, comprising a metallic shell having a vertically extending axis, a circular cross section, and first and second openings in its upper end and its lower end, respectively; a refractory lining extending around said shell; a first tube formed into a first spiral coil extending between said shell and said lining; means for introducing a cooling fluid into said first tube; an inlet in communication with the interior of said shell and disposed in tangential relation to said shell so that said gas and entrained particles are discharged tangentially into the interior of said shell for separating said gases from said entrained particles by centrifugal forces said inlet being located in the upper portion of said shell so that the separated particles fall by gravity into the lower portion of said shell and discharge through said second opening; a second tube formed into a second spiral coil extending through said first opening for providing an outlet for the separated gas which rises into said upper portion by convection; a layer of insulation material surrounding said second spiral coil; means for introducing cooling fluid into said second spiral coil; and a first and second continuous fin extending from said first and second tubes, respectively, for the lengths of said tubes and welded to adjacent sections of said tubes to render said first and second spiral coils airtight.

2. The vessel of claim 1 further comprising anchor means extending from said first fin into said refractory lining for anchoring said refractory lining.

3. The vessel of claim 1 further comprising anchor means extending from said second fin into said insulation material for anchoring said insulation material.

4. The vessel of claim 1 wherein a portion of said second tube extends within said shell and defines an annular chamber communicating with said inlet.

5. The vessel of claim 1 wherein said means for introducing cooling fluid into said second spiral coil comprises an extension of said second tube, said extension extending from one end of said second spiral coil, across said vessel and through said vessel for connection to a source of said fluid, and further comprising insulation material extending around said extension.

* * * * *